United States Patent
Burchett et al.

(10) Patent No.: US 9,616,943 B2
(45) Date of Patent: Apr. 11, 2017

(54) TRACTOR TRAILER GAP CONTROL SYSTEM

(75) Inventors: Chad Lee Burchett, Browns Summit, NC (US); Arthur Nalson Fowler, Winston-Salem, NC (US)

(73) Assignee: VOLVO GROUP NORTH AMERICA, LLC, Greensboro, NC (US)

( * ) Notice: Subject to any disclaimer, the term of this patent is extended or adjusted under 35 U.S.C. 154(b) by 1808 days.

(21) Appl. No.: 12/865,428

(22) PCT Filed: Jan. 30, 2008

(86) PCT No.: PCT/US2008/001204
§ 371 (c)(1),
(2), (4) Date: Aug. 9, 2010

(87) PCT Pub. No.: WO2009/096913
PCT Pub. Date: Aug. 6, 2009

(65) Prior Publication Data
US 2011/0295470 A1    Dec. 1, 2011

(51) Int. Cl.
*G06F 7/00* (2006.01)
*B62D 35/00* (2006.01)
*B62D 53/08* (2006.01)

(52) U.S. Cl.
CPC ....... *B62D 35/001* (2013.01); *B62D 53/0814* (2013.01)

(58) Field of Classification Search
CPC ........................... B62D 35/001; B62D 53/0814
USPC ..... 701/49, 96; 296/180.1–180.4; 280/149.2, 280/405.1, 407.1, 433, 438.1, 441.1, 280/455.1, 476.1–478.1, 656; 414/563
See application file for complete search history.

(56) References Cited

U.S. PATENT DOCUMENTS

| | | | |
|---|---|---|---|
| 3,618,969 A | 11/1971 | Glassmeyer | |
| 3,711,146 A * | 1/1973 | Madzsar et al. | 296/180.2 |
| 3,834,752 A * | 9/1974 | Cook et al. | 180/309 |
| 3,951,445 A * | 4/1976 | Tatom | 296/180.3 |
| 4,759,563 A * | 7/1988 | Nash | 280/476.1 |
| 4,761,111 A * | 8/1988 | Brown | 414/563 |
| 4,824,165 A * | 4/1989 | Fry | 296/180.3 |
| 4,844,497 A * | 7/1989 | Allen | 280/477 |
| 4,904,015 A * | 2/1990 | Haines | 296/180.3 |
| 5,564,725 A | 10/1996 | Brazeal | |
| 5,658,000 A | 8/1997 | Boudreaux | |
| 5,863,057 A | 1/1999 | Wessels | |
| 6,056,309 A * | 5/2000 | Brown | 280/447 |
| 6,203,045 B1 | 3/2001 | Kyrtsos et al. | |

(Continued)

FOREIGN PATENT DOCUMENTS

| | | | | |
|---|---|---|---|---|
| WO | 2006029732 A1 | 3/2006 | | |
| WO | WO 2006029731 A1 * | 3/2006 | ............ | B62D 53/08 |
| WO | WO 2007068762 A1 * | 6/2007 | ............ | B62D 53/08 |

*Primary Examiner* — Jerrah Edwards
*Assistant Examiner* — Majdi Alsomiri
(74) *Attorney, Agent, or Firm* — Michael Pruden; Martin Farrell (57) ABSTRACT

A method for increasing the aerodynamic efficiency of a vehicle includes monitoring operating condition of a vehicle, determining if a pre-selected event has occurred with respect to the operating condition of the vehicle, communicating a spacing value to a moving device and adjusting a spacing between a cab and a trailer of the vehicle based on the communicated spacing value.

15 Claims, 7 Drawing Sheets

(56) References Cited

U.S. PATENT DOCUMENTS

| | | |
|---|---|---|
| 6,290,450 B1 * | 9/2001 | Humphries et al. .......... 414/563 |
| 6,354,642 B1 | 3/2002 | Haggerty |
| 6,663,195 B1 | 12/2003 | Arnold |
| 6,736,420 B2 * | 5/2004 | Laarman et al. .......... 280/438.1 |
| 7,198,282 B2 * | 4/2007 | Burchett ....................... 280/433 |
| 7,410,183 B2 | 8/2008 | Stowell et al. |
| 7,490,846 B2 * | 2/2009 | Kaun ........................... 280/441 |
| 7,591,336 B2 | 9/2009 | Hackmann |
| 7,673,895 B1 * | 3/2010 | Hesse et al. ............... 280/417.1 |
| 7,717,451 B2 * | 5/2010 | Alguera .................... 280/438.1 |
| 7,789,412 B2 * | 9/2010 | Alguera .................... 280/438.1 |
| 7,806,423 B2 * | 10/2010 | Vikstrom et al. .......... 280/405.1 |
| 8,348,298 B2 * | 1/2013 | Alguera et al. ............ 280/441.1 |
| 2002/0175493 A1 | 11/2002 | Laarman |
| 2004/0075298 A1 * | 4/2004 | Wong et al. ............... 296/180.2 |
| 2004/0145150 A1 * | 7/2004 | Yeakel ......................... 280/433 |
| 2006/0091634 A1 | 5/2006 | Cole |
| 2006/0108770 A1 | 5/2006 | Burns et al. |
| 2008/0029995 A1 | 2/2008 | Alguera |
| 2008/0036173 A1 | 2/2008 | Alguera |
| 2008/0129011 A1 | 6/2008 | Bouwkamp |
| 2008/0174083 A1 | 7/2008 | Ersoy et al. |
| 2008/0265544 A1 | 10/2008 | Vikstrom et al. |
| 2009/0072515 A1 | 3/2009 | Alguera et al. |
| 2009/0127823 A1 | 5/2009 | Colibert-Clarke et al. |
| 2009/0160159 A1 | 6/2009 | Alguera |
| 2009/0160214 A1 | 6/2009 | Alguera |
| 2009/0230655 A1 | 9/2009 | Schmidt et al. |
| 2011/0015830 A1 * | 1/2011 | Chen et al. .................... 701/49 |

\* cited by examiner

FIG. 7B

TRACTOR TRAILER GAP CONTROL SYSTEM

BACKGROUND

This invention relates to a method for increasing the aerodynamic efficiency of large or heavy duty vehicles.

Heavy duty vehicles are utilized for transporting large loads. Such heavy duty vehicles include trucks for example. While these vehicles may vary in size and features, a common element among them is a fifth wheel that facilitates connecting a tractor and a trailer. The position of the fifth wheel relative to the cab of the tractor typically controls the spacing between the cab portion of the truck and the trailer portion of the truck.

In exemplary embodiments, an automated method and system is provided for adjusting the position of the trailer of a vehicle relative to the cab of the vehicle based on vehicle movement in order to increase the aerodynamic efficiency of the vehicle.

SUMMARY

In one embodiment, a method for increasing the aerodynamic efficiency of a vehicle is disclosed. The method comprises monitoring operating condition of a vehicle, determining if a pre-selected event has occurred with respect to the operating condition of the vehicle, communicating a spacing value to a moving device and adjusting a spacing between a cab and a trailer of the vehicle based on the communicated spacing value.

In another embodiment, a method for increasing the aerodynamic efficiency of a vehicle is disclosed. The method comprises monitoring the speed of the vehicle, determining if the vehicle speed matches a pre-specified speed, communicating a spacing value to a moving device and adjusting a spacing between a cab and a trailer of the vehicle based on the communicated spacing value.

In a further embodiment, a system for increasing aerodynamic efficiency of a vehicle is disclosed. The system comprises a monitoring device for monitoring at least one operating condition of a vehicle in motion, a controller in communication with the monitoring device for detecting an occurrence of a pre-selected event corresponding to the at least one operating condition and a moving device connected to receive a spacing value from the controller and configured to adjust a spacing between a cab portion and a trailer portion based on the received value.

BRIEF DESCRIPTION OF THE DRAWINGS

The several features, objects, and advantages of Applicants' invention will be understood by reading this description in conjunction with the drawings, in which.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

Figures 1A, 1B:
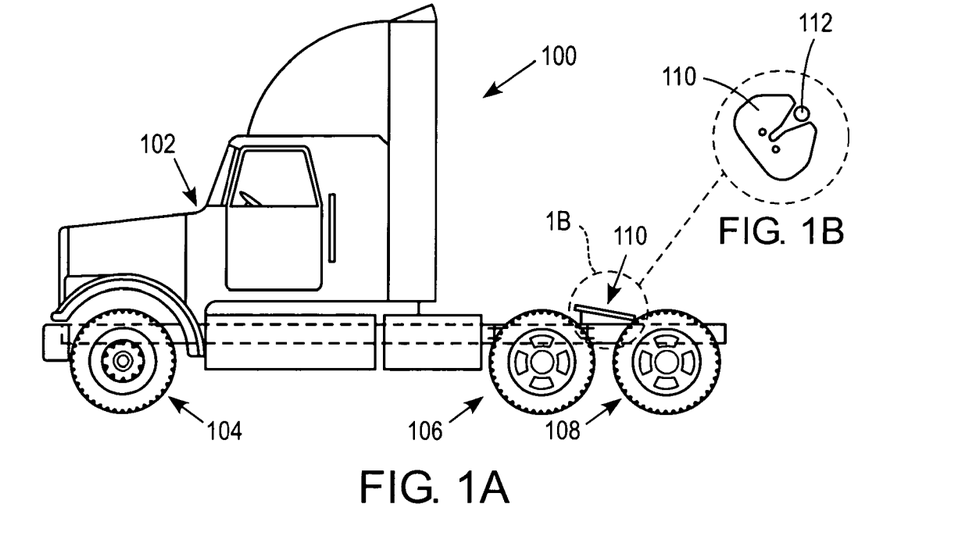
FIG. 1A illustrates a side view of a tractor.
FIG. 1B illustrates a moving device of a fifth wheel.

FIG. 1A illustrates a side view of a typical tractor 100 having a cab 102, front wheels and axle 104, a pair of rear wheels and axles 106 and 108 and a sliding fifth wheel 110. Fifth wheel 110 may provide adjustable connection between the tractor 100 and a trailer. A moving device 112 facilitates automatic movement of the fifth wheel 110 into a number of positions with respect to the cab 102 (FIG. 1B). The moving device may be a motor for example. The motor may be located on the tractor portion.

Figure 2:
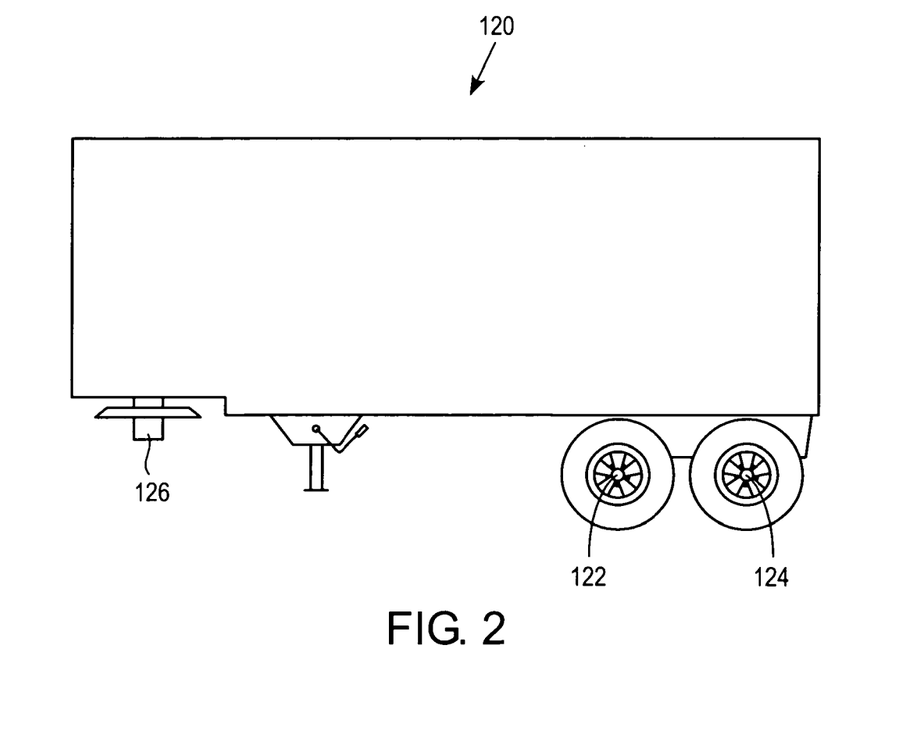
FIG. 2 illustrates a trailer.

FIG. 2 illustrates a trailer 120. Trailer 120 may include a plurality of wheel axles 122 and 124 and a connector 126. Connector 126 provides connection between the tractor 100 and trailer 120 via the sliding fifth wheel 110. The tractor 100 and trailer 120 together form a heavy duty vehicle for transporting large loads.

The position of the fifth wheel 110 can control the distance or spacing between the (back portion of the) cab 102 and the (front portion of the) trailer 120. The cab and trailer may also be referred to as a cab portion and a trailer portion.

In exemplary embodiments, the spacing between the cab 102 and trailer 120 may be reduced while the vehicle is in motion. Such reduction increases the aerodynamic efficiency of the vehicle resulting in greater fuel efficiency in the form of reduced fuel consumption for example.

Aerodynamic efficiency is directed, among other things, to reducing the drag and lift on vehicles in motion. The advantages of increasing or improving the aerodynamic efficiency of moving vehicles are well known and such efficiency is even more desirable with increasing fuel costs. Spacing between the cab and trailer affects the fuel efficiency of heavy duty trucks.

Therefore, in exemplary embodiments, the spacing between the cab 102 and trailer 120 may be adjusted based on vehicle speed to realize a more efficient utilization of fuel. The spacing may be inversely related to the vehicle speed for example. That is, as the vehicle speed increases, the spacing may be decreased and the trailer 120 may be closer to the cab 102. This may occur in conditions where the vehicle is able to maintain highway speeds with light volume of traffic or on straight roads for example.

Conversely, as the vehicle speed decreases, the spacing may be increased and trailer 120 may be farther from the cab 102. This may occur in conditions where the vehicle is unable to maintain high speeds such as in heavy traffic volume, on smaller roads with a lower posted speed limit or on roads with many turns requiring lower speed for example.

A criterion for determining the spacing between the cab 102 and the trailer 120 may be the vehicle speed. Vehicle speed is easily determined by an operator of the vehicle based on monitoring the speedometer for example.

Figure 3:
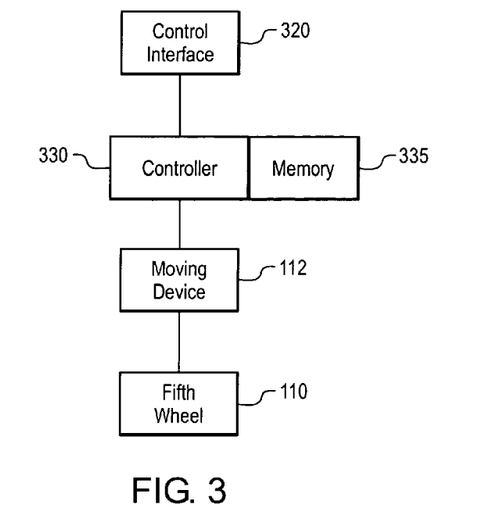
FIG. 3 illustrates a system according to exemplary embodiments.

A control system for facilitating exemplary embodiments is illustrated in FIG. 3. An electronic controller (ECU) 330 may be utilized to facilitate the automatic movement of the fifth wheel 110 to achieve the desired spacing between the cab 102 and trailer 120. ECU 330 may be a microprocessor. ECU 330 may communicate with the moving device 112 to move the fifth wheel 110. The moving device 112 is thus responsive to the ECU 330. ECU 330 may include memory 335 for pre-storing spacing values for a plurality of operating conditions (such as vehicle speed, etc.). An optional control interface 320 may also be included for proving a manual user input as described below.

Figure 4A:
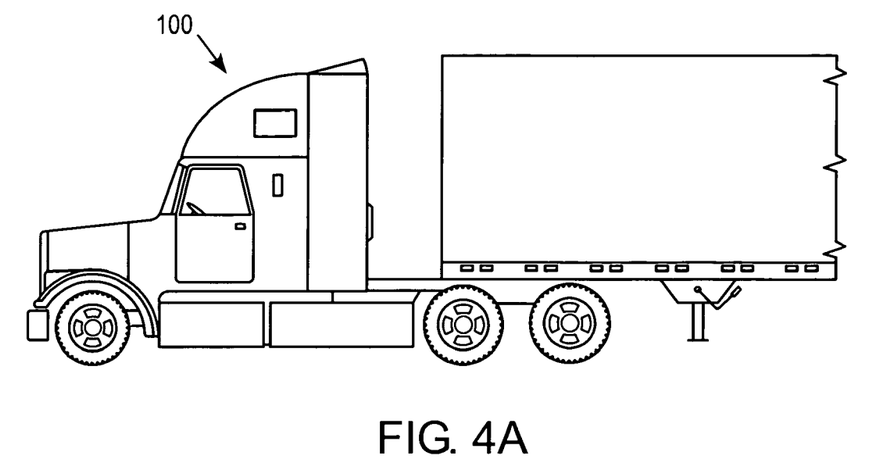
FIGS. 4A and 4B illustrate varying spacing between a cab and a trailer according to exemplary embodiments.
Figure 4B:
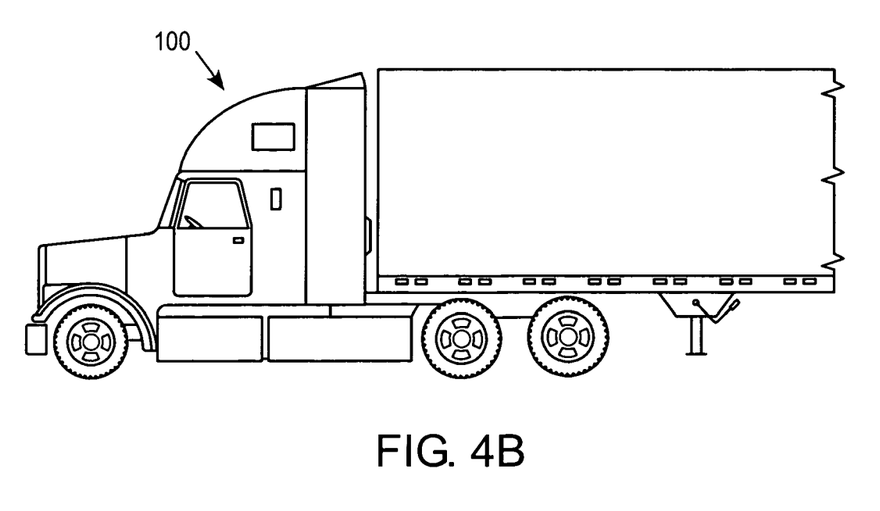
Figure 4C:
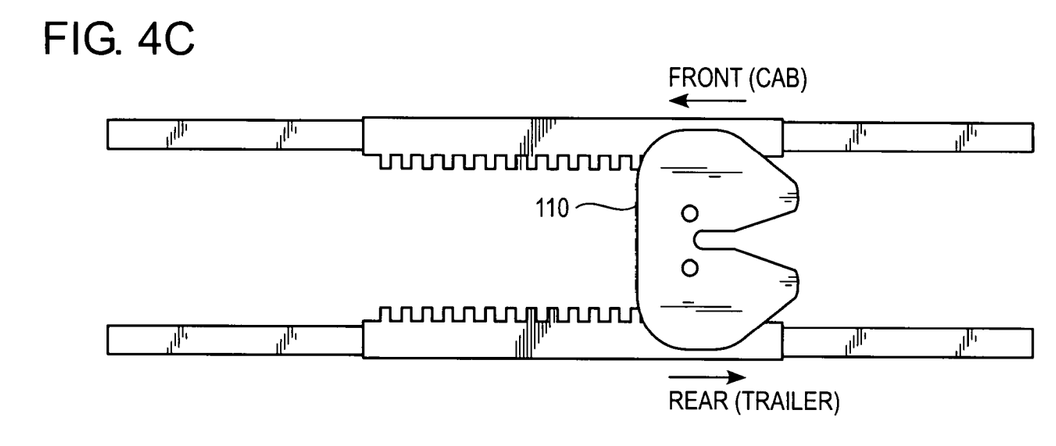
FIGS. 4C and 4D illustrate slidable fifth wheel of a tractor corresponding to the exemplary spacing of FIGS. 4A and 4B.
Figure 4D:
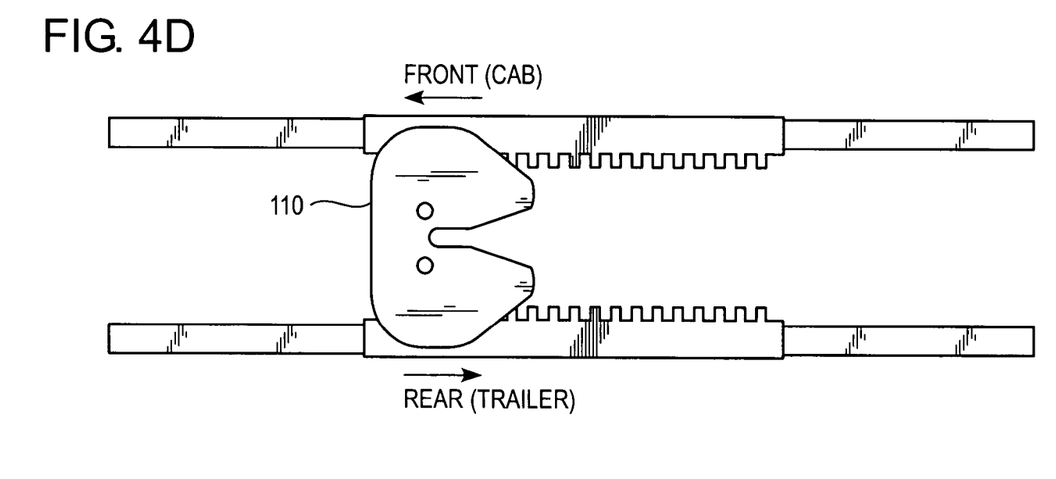

Movement of the fifth wheel 110 results adjusting spacing between the trailer 120 and the cab 102 as illustrated in FIGS. 4A and 4B. The spacing illustrated in FIG. 4A may correspond to a vehicle moving at a lower speed such as on a secondary road for example. The spacing illustrated in FIG. 4B may correspond to vehicle moving at a higher speed such as on a highway for example. Exemplary fifth wheel positions on a tractor corresponding to the spacing illustrated in FIGS. 4A and 4B may be as illustrated in FIGS. 4C and 4D respectively.

Spacing between cab 102 and trailer 120 may be adjusted either via user input (i.e. vehicle operator or driver) or in an automated manner. In the first mode, the operator of the vehicle may enter a command via control interface 320 to adjust the spacing. The operator may do so upon reaching a particular speed as indicated by the speedometer for example. Control interface 320 may be located in the cab 102 as part of a dashboard or a stand alone unit that is accessible to the operator. In some embodiments, the operator may specify the spacing between cab 102 and trailer 120.

In an automated mode, ECU 330 may initiate a process for adjusting the spacing based on the vehicle reaching a particular (pre-specified) speed for example.

In either case (i.e. both user input and automated modes), the spacing adjustment (i.e. how far should the cab 102 be from the trailer 120) may also be determined by the ECU 330 and communicated to the moving device 112. ECU 330 may have an associated memory 340. Spacing specifications for various speeds may be stored in memory 340 in the form of a table for example.

Figure 5:
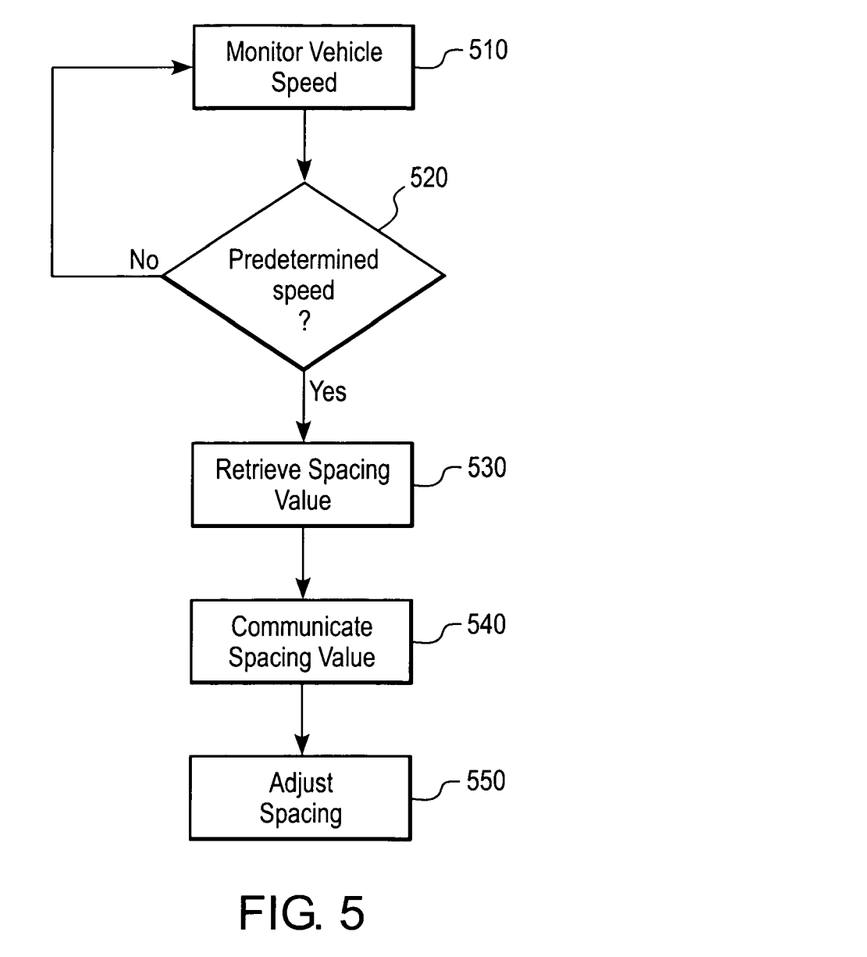
FIG. 5 illustrates a method according to exemplary embodiments.

A method in accordance with exemplary embodiments is illustrated in FIG. 5. The fifth wheel may be set at an initial setting such as that corresponding to a stationary vehicle. As the vehicle moves, the vehicle speed may be monitored at step 510. A determination is made at step 520 as to whether the vehicle has reached a predetermined speed. If the predetermined speed has been reached, as determined at step 520, ECU 330 may retrieve a spacing value for the particular speed from memory 340 at step 530. ECU 330 may communicate this value to moving device 112 at step 540. The spacing between cab 102 and trailer 120 may be adjusted based on the received spacing value at step 550. For example, moving device 112 may move the fifth wheel 110 to adjust the spacing between cab 102 and trailer 120.

In some embodiments, additional conditions may be placed on deciding when to adjust the spacing. For example, even though a predetermined vehicle speed may have been reached as determined at step 520, an additional condition may specify that this speed be maintained for predetermined period of time before adjusting the spacing. The method as described herein may be applicable equally to increasing and decreasing vehicle speeds.

If the vehicle speed is increasing and exceeds a pre-specified speed value, the spacing between cab 102 and trailer 120 may be decreased based on a specified spacing value. If the vehicle speed is decreasing and falls below a pre-specified value, the spacing between cab 102 and trailer 120 may be increased based on a specified spacing value.

Other vehicle operating conditions may also be utilized to determine spacing adjustments between cab 102 and trailer 120. These conditions may include, but are not limited to, a (vehicle) transmission gear setting, a (vehicle) transmission range setting, activation of a cruise control setting for the vehicle and operation of the vehicle for a pre-selected period of time at a pre-specified steady state speed. The specification may state that spacing should be adjusted by a particular amount if the vehicle is traveling for more than one minute at fifty miles per hour for example.

An increased transmission gear setting and increased transmission range setting indicates an increase in the vehicle speed and therefore, a decrease in the spacing between the cab and the trailer. Conversely a decreased transmission gear setting and decreased transmission range setting indicates a decrease in the vehicle speed and therefore, an increase in the spacing between the cab and the trailer.

Figure 6:
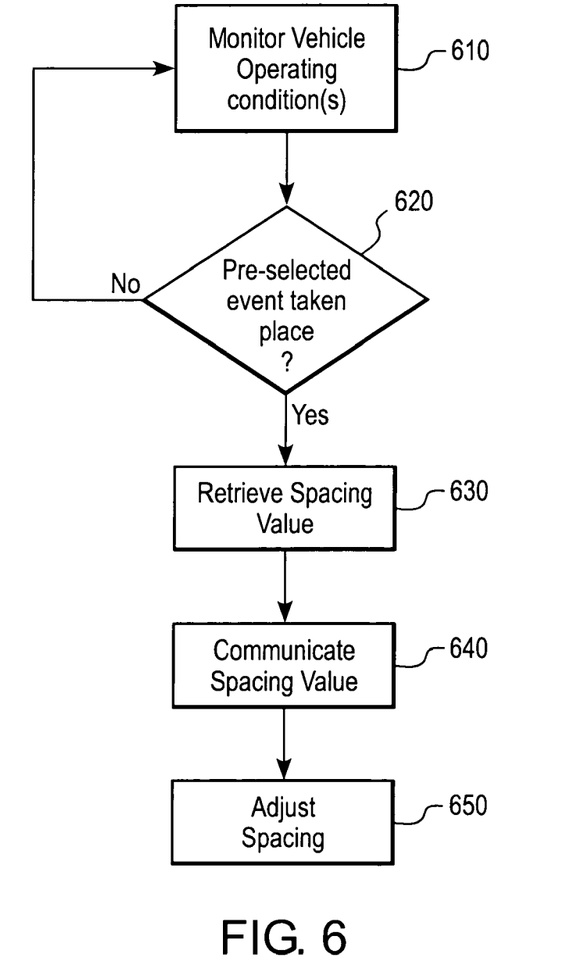
FIG. 6 illustrates a method according to exemplary embodiments.

A general method in accordance with exemplary embodiments is illustrated in FIG. 6. The fifth wheel may be set at an initial setting such as that corresponding to a stationary vehicle. As the vehicle moves, the vehicle operating condition may be monitored at step 610. The pre-selected event may be reaching or passing a certain speed, a particular transmission gear setting, a particular transmission range setting, etc. A determination may be made at step 620 as to whether a pre-selected event has taken place with the respect to the operating condition of the vehicle. If the pre-specified event has taken place, ECU 330 may retrieve a spacing value for the particular speed from memory 340 at step 630. ECU 330 may communicate this value to moving device 112 at step 640. Moving device 112 may then move the fifth wheel 110 at step 650 resulting in the specified spacing value between cab 102 and trailer 120.

The moving device 112 (i.e. a motor for example) may be an electric motor, a hydraulic motor, a hydraulic ram, a pneumatic motor, a pneumatic ram and/or magnets.

In some embodiments, spacing between the cab and trailer may be minimized (i.e. the spacing may be decreased) as a security feature when the vehicle is not in motion. This may occur when the vehicle is parked and the security feature is enabled (i.e. the vehicle is not in motion when this security feature is enabled) for example.

This minimization prevents an unauthorized operation of the vehicle since the minimum spacing between the trailer and the cab would prevent turning of the vehicle. As a result, even if one were to succeed in starting the engine without the proper keys for example, the vehicle cannot be turned due to the lack of maneuverability resulting from the decreased spacing between the cab and the trailer.

The security feature may be a vehicle alarm for example. Activation of the vehicle alarm may trigger minimization of the spacing between the cab and the trailer. The security feature may also be engagement of the parking or emergency brake for example.

Exemplary embodiments as described may also provide safety aspects to vehicle operation in adverse weather related conditions. For example, as a vehicle slows down due to snowy or icy conditions, the increased spacing between the cab and trailer would prevent the so-called "jack-knifing" of the vehicle.

Each of the vehicle operating conditions (vehicle speed, vehicle transmission gear setting, etc.) may also be monitored by a monitoring device 340 (of FIG. 3) such as a processor for example. The monitoring device may be in communication with ECU 330.

The description herein has focused on varying the spacing between the cab and the trailer via movement of the fifth wheel of the cab. In other exemplary embodiments, the adjustment or change in spacing between the cab 102 and the trailer 120 may also be realized via a kingpin 710 on the trailer as illustrated in FIGS. 7A and 7B.

Figure 7A:
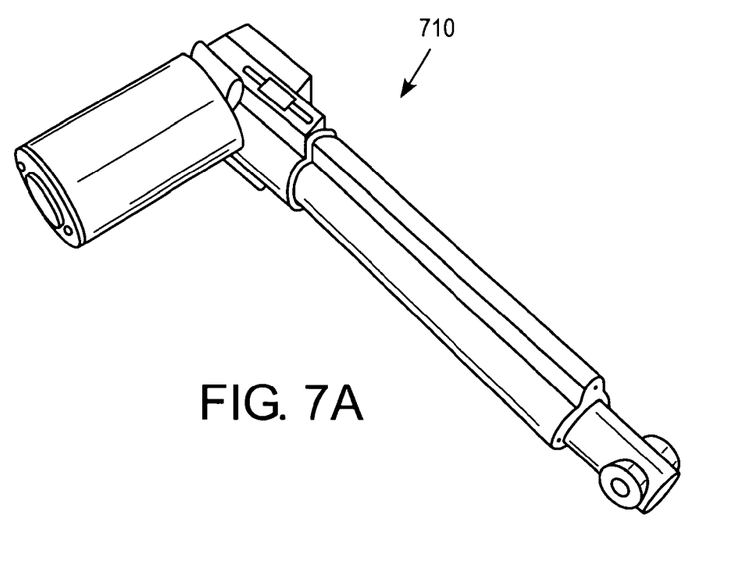
FIGS. 7A and 7B illustrates a slidable kingpin for varying spacing between a cab and a trailer according to exemplary embodiments.
Figure 7B:
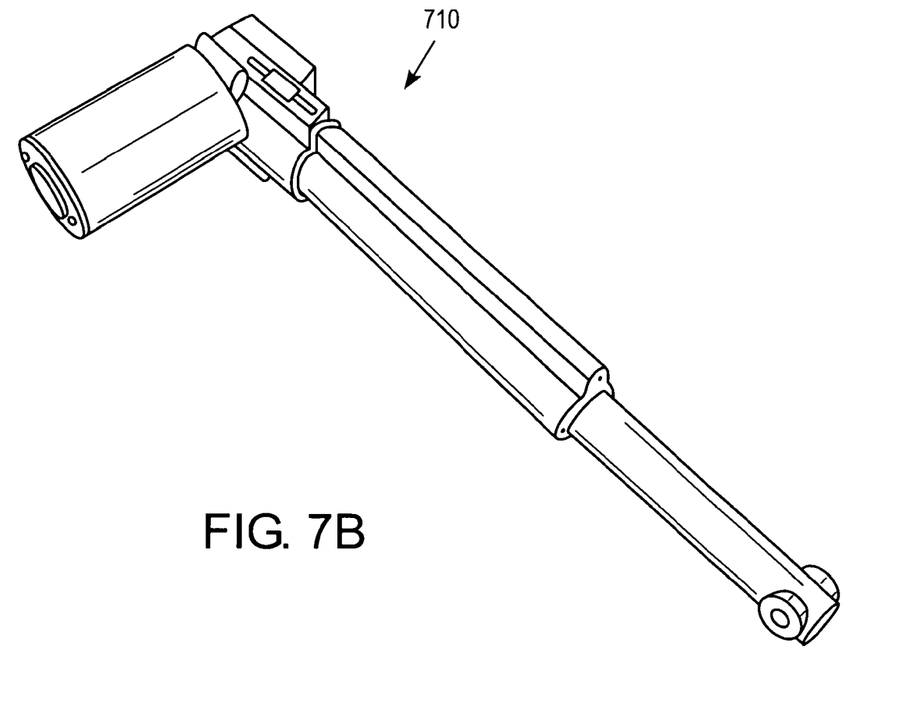

Kingpin 710 of FIG. 7A may correspond to the exemplary spacing between cab 102 and trailer 120 as illustrated in FIG. 4A. Kingpin 710 of FIG. 7B may correspond to the exemplary spacing between cab and 102 and trailer 120 as illustrated in FIG. 4B. Kingpin 710 may also be moved by a motor. Kingpins are known and are not described further.

It will be appreciated that procedures described above may be carried out repetitively as necessary to control a vehicle. To facilitate understanding, many aspects of the invention are described in terms of sequences of actions that can be performed by, for example, elements of a programmable computer system. It will be recognized that the various actions could be performed by a combination of specialized circuits and mechanical elements. The control signals for mechanically moving the fifth wheel or the kingpin may be generated by an electronic controller. The circuits may be discrete logic gates interconnected to perform a specialized function or application-specific integrated circuits.

Moreover, the monitoring and control signals of the invention can additionally be considered to be embodied within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM, EEPROM, or Flash memory), an optical fiber, and a portable compact disc read-only memory (CD-ROM).

Thus, the invention may be embodied in many different forms, not all of which are described above, and all such forms are contemplated to be within the scope of the invention. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method for increasing the aerodynamic efficiency of a vehicle comprising:
   monitoring an operating condition of a vehicle;
   determining if a pre-selected event has occurred with respect to the operating condition of the vehicle;
   communicating a spacing value to a moving device that repositions a trailer kingpin; and
   using the moving device to reposition the trailer kingpin along the trailer, as the vehicle travels, and thereby adjust a spacing between a cab and the trailer of the vehicle based on the communicated spacing value.

2. The method of claim 1, wherein the operating condition is a transmission gear setting.

3. The method of claim 1, wherein the operating condition is a transmission range setting.

4. The method of claim 1, wherein the operating condition is maintaining a particular steady state speed for a pre-selected period of time.

5. The method of claim 1, wherein the operating condition is an activation of a cruise control setting.

6. The method of claim 1, wherein the spacing value is retrieved from a memory by an electronic control unit of the vehicle.

7. The method of claim 1, wherein the operating condition is a plurality of operating conditions, the conditions including at least one of a vehicle speed, a vehicle transmission gear setting, a vehicle transmission range setting, a vehicle cruise control status and vehicle acceleration.

8. The method of claim 7, wherein determining if a pre-selected event has occurred comprises detecting an increased vehicle transmission gear setting and wherein the step of adjusting a spacing comprises decreasing the spacing between the cab and the trailer.

9. The method of claim 7, wherein determining if a pre-selected event has occurred comprises detecting a decreased vehicle transmission gear setting and wherein the step of adjusting a spacing comprises increasing the spacing between the cab and the trailer.

10. The method of claim 7, wherein determining if a pre-selected event has occurred comprises detecting an increased vehicle transmission range setting and wherein the step of adjusting a spacing comprises decreasing the spacing between the cab and the trailer.

11. The method of claim 7, wherein determining if a pre-selected event has occurred comprises detecting a decreased vehicle transmission range setting and wherein the step of adjusting a spacing comprises increasing the spacing between the cab and the trailer.

12. The method of claim 1, wherein the operating condition that is being monitored is a parking or an emergency brake of the vehicle and wherein the pre-selected event is an activation of the brake.

13. The method of claim 1, wherein the operating condition that is being monitored is an alarm system of the vehicle and wherein the pre-selected event is an activation of the alarm.

14. A method for increasing the aerodynamic efficiency of a vehicle comprising:
    monitoring a speed of the vehicle;
    determining if the vehicle speed matches a pre-specified speed;
    communicating a spacing value to a moving device that repositions a trailer kingpin;
    using the moving device to reposition the trailer kingpin along the trailer, as the vehicle travels, and thereby adjust a spacing between a cab and the trailer of the vehicle based on the communicated spacing value.

15. A system for increasing aerodynamic efficiency of a vehicle, comprising:

a monitoring device for monitoring at least one operating condition of a vehicle in motion;

a controller in communication with the monitoring device for detecting an occurrence of a pre-selected event corresponding to the at least one operating condition; and a moving device connected to receive a spacing value from the controller and configured to repositions a trailer kingpin along the trailer, as the vehicle travels, and thereby adjust a spacing between a cab portion and a trailer portion based on the received value.

* * * * *